US010650417B2

(12) United States Patent
Katzen et al.

(10) Patent No.: US 10,650,417 B2
(45) Date of Patent: May 12, 2020

(54) SOCIAL MEDIA MESSAGING MANAGEMENT FOR BRAND INTEGRITY

(71) Applicant: International Business Machines Corporation, Armonk, NY (US)

(72) Inventors: Erik H. Katzen, Argyle, TX (US); Sumit Patel, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 14/926,196

(22) Filed: Oct. 29, 2015

(65) Prior Publication Data
US 2017/0124600 A1 May 4, 2017

(51) Int. Cl.
*G06Q 30/02* (2012.01)
*H04L 12/58* (2006.01)
*G06Q 50/00* (2012.01)

(52) U.S. Cl.
CPC ......... *G06Q 30/0277* (2013.01); *G06Q 50/01* (2013.01); *H04L 51/063* (2013.01); *H04L 51/32* (2013.01)

(58) Field of Classification Search
CPC .... G06Q 30/0277; G06Q 50/01; H04L 51/32; H04L 51/063
See application file for complete search history.

(56) References Cited

U.S. PATENT DOCUMENTS

| | | | |
|---|---|---|---|
| 6,449,657 B2 * | 9/2002 | Stanbach, Jr. ......... | G06Q 30/02 709/245 |
| 8,447,852 B1 | 5/2013 | Penumaka et al. | |
| 2003/0093318 A1 * | 5/2003 | Komaki ................ | G06Q 30/02 705/14.4 |
| 2008/0306809 A1 * | 12/2008 | Kwak .................... | G06Q 30/02 705/14.54 |
| 2009/0009317 A1 * | 1/2009 | Weaver ................. | G06Q 10/06 340/517 |
| 2010/0153210 A1 * | 6/2010 | Oh ........................ | G06Q 30/02 705/14.52 |

(Continued)

OTHER PUBLICATIONS

Anonymous, "Sentiment Analysis for Social Media Screening," ip.com, May 8, 2014.

*Primary Examiner* — Raquel Alvarez
(74) *Attorney, Agent, or Firm* — Steven M. Greenberg, Esq.; Shutts & Bowen LLP

(57) ABSTRACT

Embodiments of the invention provide a method, system and computer program product for social media messaging management for brand integrity. The method includes retrieving content from different Web sites from over a computer communications network into a social media messaging manager executing in memory of a host computing system. The method further includes parsing text of the retrieved content to identify information pertaining to a contemporaneous news event. Thereafter, the parsed text is matched to an advertising message disposed in a table stored in a data store coupled to the host computing system. Consequently, at least a portion of a social media message is generated incorporating the predetermined advertising message and the social media message is displayed in a user interface of the manager. Finally, the social media message is posted onto a social media messaging system by the manager over the computer communications network.

20 Claims, 2 Drawing Sheets

(56) References Cited

U.S. PATENT DOCUMENTS

| | | | |
|---|---|---|---|
| 2011/0258560 A1 | 10/2011 | Mercuri et al. | |
| 2012/0226995 A1* | 9/2012 | Kimchi | G06F 17/30867 715/747 |
| 2013/0066716 A1* | 3/2013 | Chen | G06Q 30/00 705/14.49 |
| 2015/0117624 A1* | 4/2015 | Rosenshine | H04M 3/42042 379/142.04 |
| 2015/0213484 A1* | 7/2015 | Amara | G06Q 30/0246 705/14.45 |
| 2016/0380936 A1* | 12/2016 | Gunasekara | G06Q 10/107 709/206 |

\* cited by examiner

SOCIAL MEDIA MESSAGING MANAGEMENT FOR BRAND INTEGRITY

BACKGROUND OF THE INVENTION

Field of the Invention

The present invention relates to social media messaging and more particularly to social media messaging monitoring and governance.

Description of the Related Art

The Internet has fueled the explosive growth of advertising messaging, previously limited for most to print media messaging and for the well funded, radio and television messaging. The Internet and in particular, the World Wide Web (the "Web"), has fueled advanced opportunities for global product and service messaging for even the least funded of advertisers. However, the ease in which advertising messaging exists for all today is not without consequence. Indeed, prior to the development of the Web, the costs of advertising were such that tremendous planning had been part and parcel of the traditional advertising campaign given the substantial cost of a failed campaign. But, the accessibility of the Internet medium has resulted in a substantial loosening of the standards based upon which advertising messaging occurs. As such, the Internet bursts with less than optimal advertising messaging and, in some cases, harmful messaging finds its way through the Internet into the mind of the consumer.

The development of social media and the micro-message has only compound matters. Social media outlets that support the subscription based exchange of small messages permit tiny advertising messages to immediately flow into view of a tremendous number of subscribers and those socially related to the subscribers. However, the limitation of message size appears not to be a limitation at all. Rather, the smallest advertising message transmitted by social media can have far reaching consequences—both positive and negative—in respect to the product or service being advertised. With respect to the former, a strategically timed message can have incredible impact upon the consumer awareness of a product or service, especially as the messaging relates to a contemporaneously occurring event. Conversely, with respect to the latter, an ill-conceived message lacking in thoughtfulness and resulting from a lack of planning and foresight can have devastating consequences on a corresponding brand.

BRIEF SUMMARY OF THE INVENTION

Embodiments of the present invention address deficiencies of the art in respect to social media messaging and provide a novel and non-obvious method, system and computer program product for social media messaging management for brand integrity. In an embodiment of the invention, a method for social media messaging management for brand integrity includes retrieving content from different Web sites from over a computer communications network into a social media messaging manager executing in memory of a host computing system. The method further includes parsing text of the retrieved content in memory of the host computing system to identify information pertaining to a contemporaneous news event. Thereafter, the parsed text is matched by a processor of the host computing system to an advertising message disposed in a table stored in a data store coupled to the host computing system. Consequently, at least a portion of a social media message is generated incorporating the predetermined advertising message and the social media message is displayed in a user interface of the manager. Finally, the social media message is posted onto one or more social media messaging systems by the manager over the computer communications network.

In another embodiment of the invention, a different generated message is received in the manager that is directed for posting onto at least one of the social media messaging systems. In response, text of the different generated message is parsed in the memory of the host computing system and compared by a processor of the host computing system to a table of restricted terms. Thereafter, the different generated message is censored in the manager when a presence of at least one of the restricted terms is determined in the text. Optionally, the table of restricted terms is a table of terms correlated to terms of the contemporaneous events. As another option, a score is computed for the different generated message based at least in part upon a presence of terms in the different generated message correlated to the contemporaneous events, and also a score is computed for the social media message based at least in part upon a presence of terms in the social media message correlated to the contemporaneous events.

In yet another embodiment of the invention, a social media messaging data processing system is configured for social media messaging management for brand integrity. The system includes a host computing system that has at least one computer with memory and at least one processor, and is communicatively coupled over a computer communications network to a multiplicity of different Web sites and social media messaging systems. The system also includes a social media messaging management module including program code executing in the memory of the host computing system. The program code is enabled to retrieve content from different Web sites, to parse text of the retrieved content to identify information pertaining to a contemporaneous news event, to match the parsed text to an advertising message disposed in a table stored in a data store coupled to the host computing system, to generate at least a portion of a social media message incorporating the predetermined advertising message, to display the social media message, and to post the social media message onto one or more of the social media messaging systems.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for social media messaging management for brand integrity. In accordance with an embodiment of the invention, a social media management module interacts manages the generation and posting of social media messages onto different social media Web sites by censuring the postings of generated messages so as to avoid the posting of messages generated with controversial content, and also by stimulating the generation of messages utilizing content correlated to detected external events. In this way, the advantage of social media as a channel for advertising messaging is not outweighed by the risks of unfettered utilization of social media as a channel for advertising messaging while the utilization of social media as a channel for advertising messaging is optimized.

Figure 1:
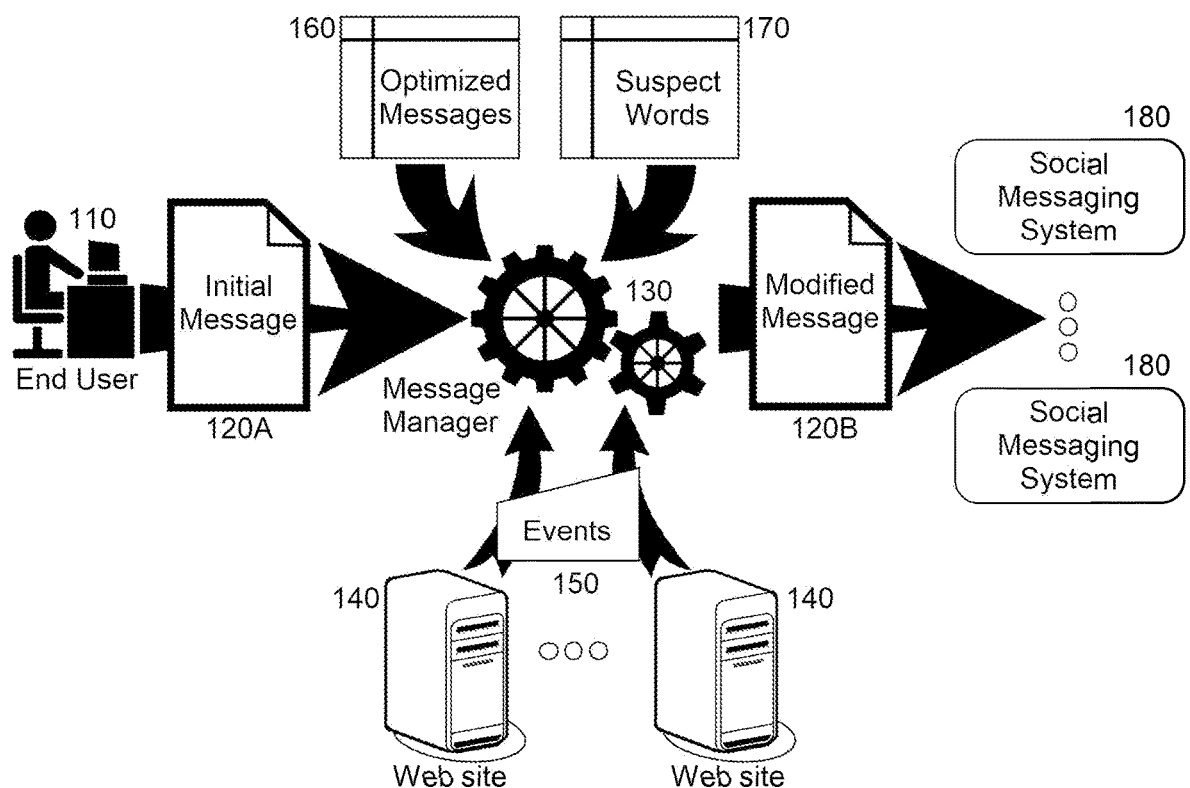
FIG. 1 is a pictorial illustration of a process for social media messaging management for brand integrity.

In further illustration, FIG. 1 pictorially shows a process for social media messaging management for brand integrity. As shown in FIG. 1 an end user 110 generates an initial message 120A directed for posting on one or more social media messaging systems 180. Message manager 130 intercepts the initial message 120 and parses the content thereof to determine whether or not one or more suspect words 170 are present in the initial message 120A. In this regard, the suspect words 170 include a list of words pre-determined to potentially contribute to undesirable effects were the initial message 120A to proceed to post to the one or more social media messaging systems 180.

Additionally, the suspect words 170 may include terms associated with a contemporaneous event 150 detected through the monitoring of news content in different Web sites 140 by the message manager 130. To the extent the initial message 120 is determined to include one or more of the suspect words 170, the initial message is either censored completely from posting to the social media messaging systems 120B, or partially so as to produce a modified message 120B for posting onto the social media messaging systems 180.

Of note, in addition to completely or partially censoring the initial message 120A, the message manager 130 may also automatically propose a modified message 120B based upon the detection of one or more events 150 in the Web sites 140. In particular, upon detecting a particular event 150, a table of optimized messages correlating to the event 150 can be consulted to identify a pre-specified advertising message. The message manager 130 then utilizes the pre-specified advertising message as part or all of the modified message 120B directed for posting onto one or more of the social media messaging systems 180.

Figure 2:
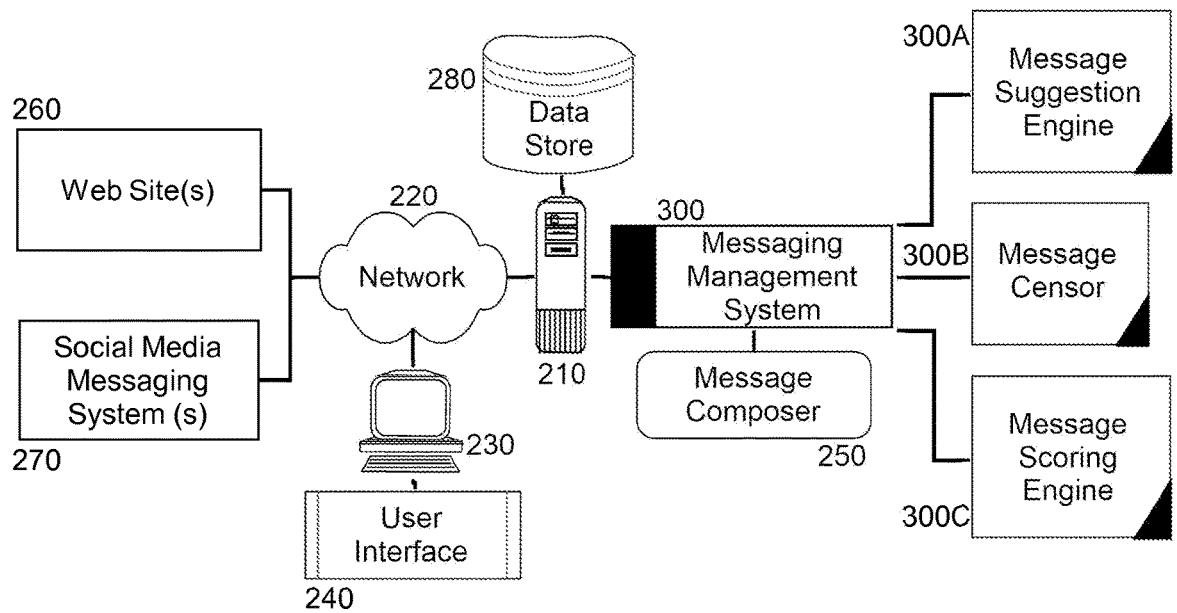
FIG. 2 is a schematic illustration of a social media messaging data processing system configured for social media messaging management for brand integrity; and, FIGS. 3A and 3B, taken together, are a flow chart illustrating a process for social media messaging management for brand integrity.

The process described in connection with FIG. 1 is implemented in a data processing system. In yet further illustration, FIG. 2 schematically shows a social media messaging data processing system configured for social media messaging management for brand integrity. The system includes a host computing system 210 that includes one or more computers each with memory and at least one processor. The host computing system 210 is communicatively coupled to a client computer 230 over computer communications network 220. As well, the host computing system 210 is communicatively coupled to different Web sites 260 and also different social media messaging systems 270 over the computer communications network 220.

A messaging management system 300 is coupled to a message composer 250 configured to receive a composed message from an end user interacting with the message composer 250 through a user interface 240 for posting to different ones of the social media messaging systems 270. The messaging management system 300 is defined by program code enabled upon execution in the memory of the host computing system 210 to manage messages composed in the user interface 240 in order to ensure brand integrity. The program code is subdivided into three separate modules: a message suggestion engine 300A, a message censor 300B and a message scoring engine 300C.

The message suggestion engine 300A includes program code adapted to monitor the content of the different Web sites 260 in order to identify trending newsworthy events such as those evident from trending topics enabled for retrieval through an application programming interface to selected ones of the Web sites 260 and including the social media messaging systems 270. The message suggestion engine 300 then can map a particular identified newsworthy event to a previously composed advertising message stored in data store 280. Finally, the message suggestion engine 300 can generate a social media message incorporating the advertising message for presenting to the end user in the user interface 240 as a suggestion for posting to one or more of the social media messaging systems 270.

The message censor 300B in turn includes program code enabled to receive a composed message from the user interface 240 directed for posting onto one or more of the social media messaging systems 270. The program code parses the content of the message so as to identify one or more words present in a suspect list of words in the data store 280. Notably, the program code may also identify as present in the message words associated with an event detected in the message suggestion engine 300A pertaining to a newsworthy event of a tragic or negative nature. In either circumstance, the program code further responds to the presence of a suspect word in the message by censoring the message either fully by discarding the message, or partially by redacting, removing words from or otherwise modifying the message prior to posting onto the social media messaging systems 270.

Finally, the message scoring engine 300C includes program code enabled to receive from other end users, different ratings for the different pre-stored advertising messages and to remove from storage, those of the advertising messages lacking a composite rating above a threshold value. As well, the program code of the message scoring engine 300C is enabled to dynamically parse the text of a message received from the user interface 240 and to apply a score thereto based upon the presence in the message of terms correlated to one or more terms or phrases in a list of preferred terms or phrases, each term or phrase in the list having been assigned a corresponding value. To the extent the score exceeds a threshold value, the message is permitted to be published by the message scoring engine 300C; but, otherwise the message scoring engine 300C displays in the user interface 240 a suggestion to modify the message within one or more of the terms or phrases in the list.

Finally, the program code of the message scoring engine 300C is enabled to dynamically parse the test of a message received from the user interface 240 and to apply a score thereto based upon the presence in the message of terms correlated to one or more newsworthy events detected by the message suggestion engine 300A, the lack of presence in the message of terms correlated to one or more newsworthy events detected by the message suggestion engine 300A, and the presence in the message of suspect terms. The resulting score can be displayed to the end user in the user interface 240 prior to the end user directing a posting of the message to the social media messaging systems.

Figure 3A:
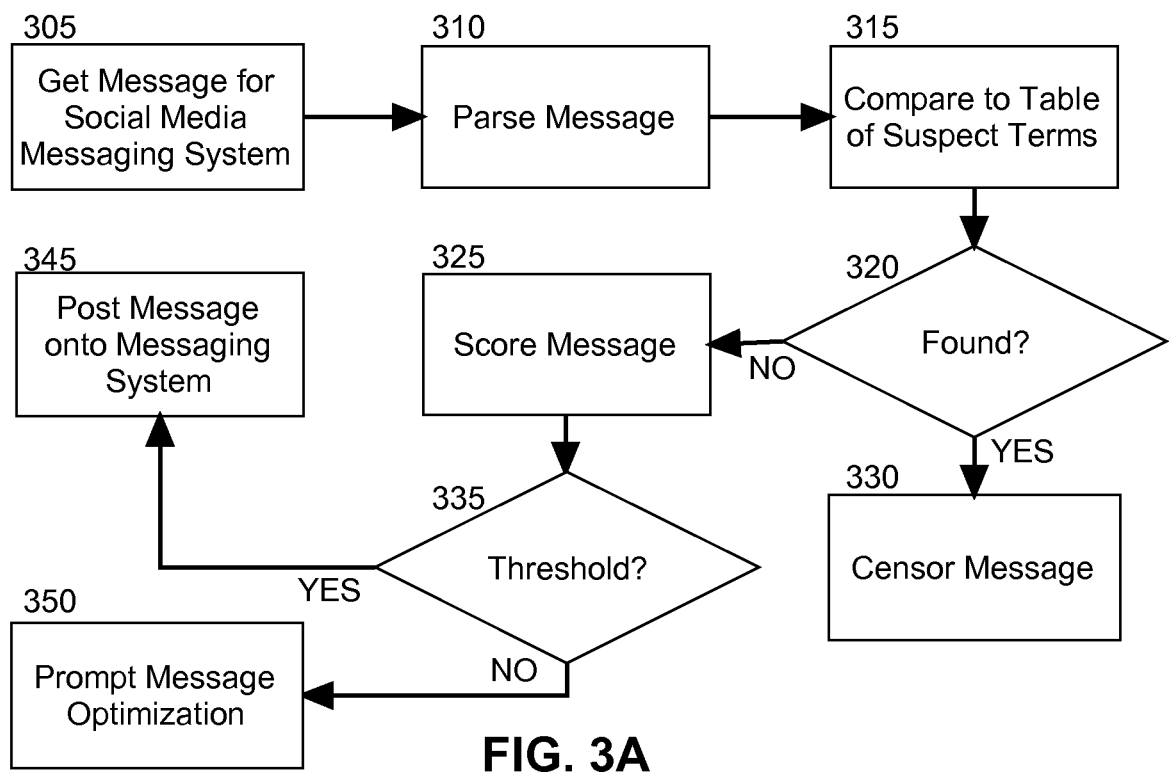
Figure 3B:
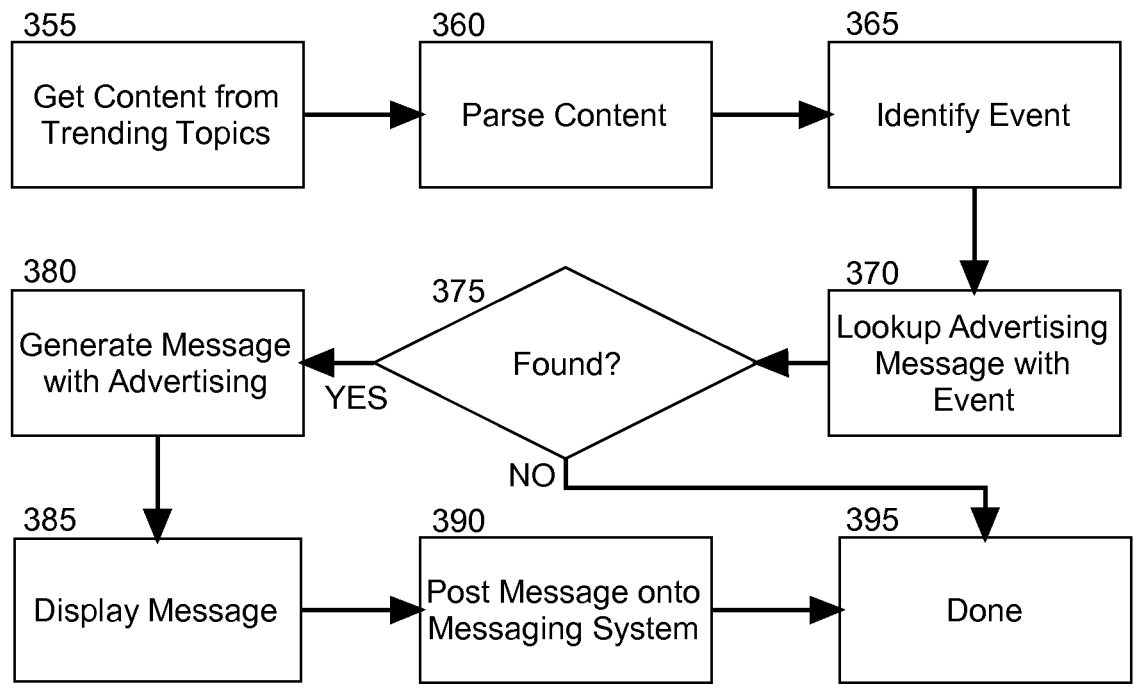

In even yet further illustration of the operation of the messaging management system 300, FIGS. 3A and 3B, taken together, are a flow chart illustrating a process for social media messaging management for brand integrity. Beginning in block 305 of FIG. 3A, a composed message directed for posting to one or more social media messaging systems is received and parsed in block 310. In block 315, the words of the message are compared to a table of suspect terms. In decision block 320, if one or more of the suspect words are found present in the message, in block 330 the message is censored either fully or partially. Otherwise, if one or more of the suspect words are not found present in the message, in block 325 the message is scored based upon a presence of different words or phrases with corresponding values stored in a table of preferred words or phrases. In decision block 335, if the score exceeds a threshold value, in block 345 the message is posted onto a social messaging system. Otherwise, in block 350 a prompt is displayed suggesting one or more changes to the message based upon the table of preferred words or phrases.

Turning now to FIG. 3B, beginning in block 355, one or more trending topics are retrieved from over a computer communications network and the content of the trending topics is parsed in block 360. In block 365, a newsworthy, contemporaneous event is correlated to the parsed content and in block 370 a selection of pre-stored advertising messages are inspected in connection with the event. In decision block 375, if one of the pre-stored advertising messages maps to the event, in block 380 a message is generated incorporating the mapped advertising message. Thereafter, in block 385 the generated message is displayed as a suggestion and in block 390 the message is posted onto one or more of the social media messaging systems. Finally, the process ends in block 395.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for social media messaging management for brand integrity, the method comprising:
   retrieving content from different Web sites from over a computer communications network into a social media messaging manager executing in memory of a host computing system, the retrieved content from each different one of the Web sites referring to a same contemporaneous news event;
   generating a table in a data store coupled to the host computing system and inserting into the table different advertising messages, each corresponding to a different one of a multiplicity of contemporaneous news events;
   parsing text of the retrieved content in memory of the host computing system to identify information pertaining to one of the contemporaneous news events;
   matching the one of the contemporaneous news events identified with respect to the parsed text by a processor of the host computing system to a particular one of the different advertising messages disposed in the table;
   receiving from an end user a social media message in a user interface to the social media message manager, and modifying the social media message by removing from the social media message, words associated with the contemporaneous news event, generating by the processor a new portion of the social media message incorporating the predetermined advertising message and adding the new portion to the social media message to create a modified message with the new portion and without the words associated with the contemporaneous news event;
   displaying the modified social media message in a user interface of the manager; and,
   posting the modified social media message in place of the received social media message onto a social media messaging system by the manager over the computer communications network.

2. The method of claim 1, further comprising:
   receiving in the manager a different generated message in the manager directed for posting onto the social media messaging system;
   parsing text of the different generated message in the memory of the host computing system;
   comparing the text by a processor of the host computing system to a table of restricted terms; and,
   censoring the different generated message in the manager responsive to determining a presence of at least one of the restricted terms in the text.

3. The method of claim 2, wherein the table of restricted terms is a table of terms correlated to terms of the contemporaneous events.

4. The method of claim 2, wherein a score is computed for the different generated message based at least in part upon a presence of terms in the different generated message correlated to the contemporaneous events and wherein a score is computed for the social media message based at least in part upon a presence of terms in the social media message correlated to the contemporaneous events.

5. The method of claim 1, further comprising:
   receiving in the manager a different generated message in the manager directed for posting onto the social media messaging system;
   parsing text of the different generated message in the memory of the host computing system;
   comparing the text by a processor of the host computing system to a table of preferred terms and phrases;

scoring the different generated message based upon a sum of values of words and phrases in the table of preferred terms and phrases; and, displaying in the user interface a prompt recommending a change to the different generated message responsive to determining the score of the different generated message does not exceed a threshold value.

6. The method of claim 1, wherein the retrieved content is content retrieved from a trending topics portion of the different Web sites.

7. The method of claim 1, wherein the advertising message is a message pre-tested amongst a focus group and determined based upon ratings received during the pre-testing to be an effective advertising message.

8. A social media messaging data processing system configured for social media messaging management for brand integrity, the system comprising:

a host computing system comprising at least one computer with memory and at least one processor, the system being communicatively coupled over a computer communications network to a multiplicity of different Web sites and social media messaging systems; and, a social media messaging management module comprising program code executing in the memory of the host computing system, the program code being enabled to retrieve content from different Web sites, the retrieved content from each different one of the Web sites referring to a same contemporaneous news event, to generate a table in a data store coupled to the host computing system and inserting into the table different advertising messages, each corresponding to a different one of a multiplicity of contemporaneous news events, to parse text of the retrieved content to identify information pertaining to one of the contemporaneous news events, to match the one of the contemporaneous news events identified with respect to the parsed text to a particular one of the different advertising messages disposed in the table, to receive from an end user a social media message in a user interface to the social media message management module, and modify the social media message by removing from the social media message, words associated with the contemporaneous new event, generate a new portion of the social media message incorporating the predetermined advertising message and add the new portion to the social media message to create a modified message with the new portion and without the words associated with the contemporaneous news event, to display the modified social media message, and to post the modified social media message in place of the received social media message onto one or more of the social media messaging systems.

9. The system of claim 8, wherein the program code further receives a different generated message directed for posting onto one or more of the social media messaging systems, parses text of the different generated message, compares the text to a table of restricted terms and censors the different generated message responsive to determining a presence of at least one of the restricted terms in the text.

10. The system of claim 9, wherein the table of restricted terms is a table of terms correlated to terms of the contemporaneous events.

11. The system of claim 9, wherein a score is computed for the different generated message based at least in part upon a presence of terms in the different generated message correlated to the contemporaneous events and wherein a score is computed for the social media message based at least in part upon a presence of terms in the social media message correlated to the contemporaneous events.

12. The system of claim 8, wherein the retrieved content is content retrieved from a trending topics portion of the different Web sites.

13. The system of claim 8, wherein the advertising message is a message pre-tested amongst a focus group and determined based upon ratings received during the pre-testing to be an effective advertising message.

14. A computer program product for social media messaging management for brand integrity, the computer program product comprising a computer readable storage medium having program instructions embodied therewith, the program instructions executable by a device to cause the device to perform a method comprising:

retrieving content from different Web sites from over a computer communications network into a social media messaging manager executing in memory of a host computing system, the retrieved content from each different one of the Web sites referring to a same contemporaneous new event;

generating a table in a data store coupled to the host computing system and inserting into the table different advertising messages, each corresponding to a different one of a multiplicity of contemporaneous news events;

parsing text of the retrieved content in memory of the host computing system to identify information pertaining to one of the contemporaneous news events;

matching the one of the contemporaneous news events identified with respect to the parsed text to a particular one of the different advertising messages disposed in the table;

receiving from an end user a social media message in a user interface to the social media message manager, and modifying the social media message by removing from the social media message, words associated with the contemporaneous news event, generating by the processor a new portion of the social media message incorporating the predetermined advertising message and adding the new portion to the social media message to create a modified message with the new portion and without the words associated with the contemporaneous news event;

displaying the modified social media message in the user interface of the manager; and, posting the modified social media message in place of the received social media message onto a social media messaging system by the manager over the computer communications network.

15. The computer program product of claim 14, wherein the method further comprises:

receiving in the manager a different generated message in the manager directed for posting onto the social media messaging system;

parsing text of the different generated message in the memory of the host computing system;

comparing the text by a processor of the host computing system to a table of restricted terms; and, censoring the different generated message in the manager responsive to determining a presence of at least one of the restricted terms in the text.

16. The computer program product of claim 15, wherein the table of restricted terms is a table of terms correlated to terms of the contemporaneous events.

17. The computer program product of claim 15, wherein a score is computed for the different generated message based at least in part upon a presence of terms in the different generated message correlated to the contemporaneous events and wherein a score is computed for the social media message based at least in part upon a presence of terms in the social media message correlated to the contemporaneous events.

18. The computer program product of claim 14, wherein the method further comprises:
- receiving in the manager a different generated message in the manager directed for posting onto the social media messaging system;
- parsing text of the different generated message in the memory of the host computing system;
- comparing the text by a processor of the host computing system to a table of preferred terms and phrases;
- scoring the different generated message based upon a sum of values of words and phrases in the table of preferred terms and phrases; and,
- displaying in the user interface a prompt recommending a change to the different generated message responsive to determining the score of the different generated message does not exceed a threshold value.

19. The computer program product of claim 14, wherein the retrieved content is content retrieved from a trending topics portion of the different Web sites.

20. The computer program product of claim 14, wherein the advertising message is a message pre-tested amongst a focus group and determined based upon ratings received during the pre-testing to be an effective advertising message.

* * * * *